May 12, 1964     A. C. HALLER     3,132,888
CARGO PICKUP HOOK
Filed June 26, 1961
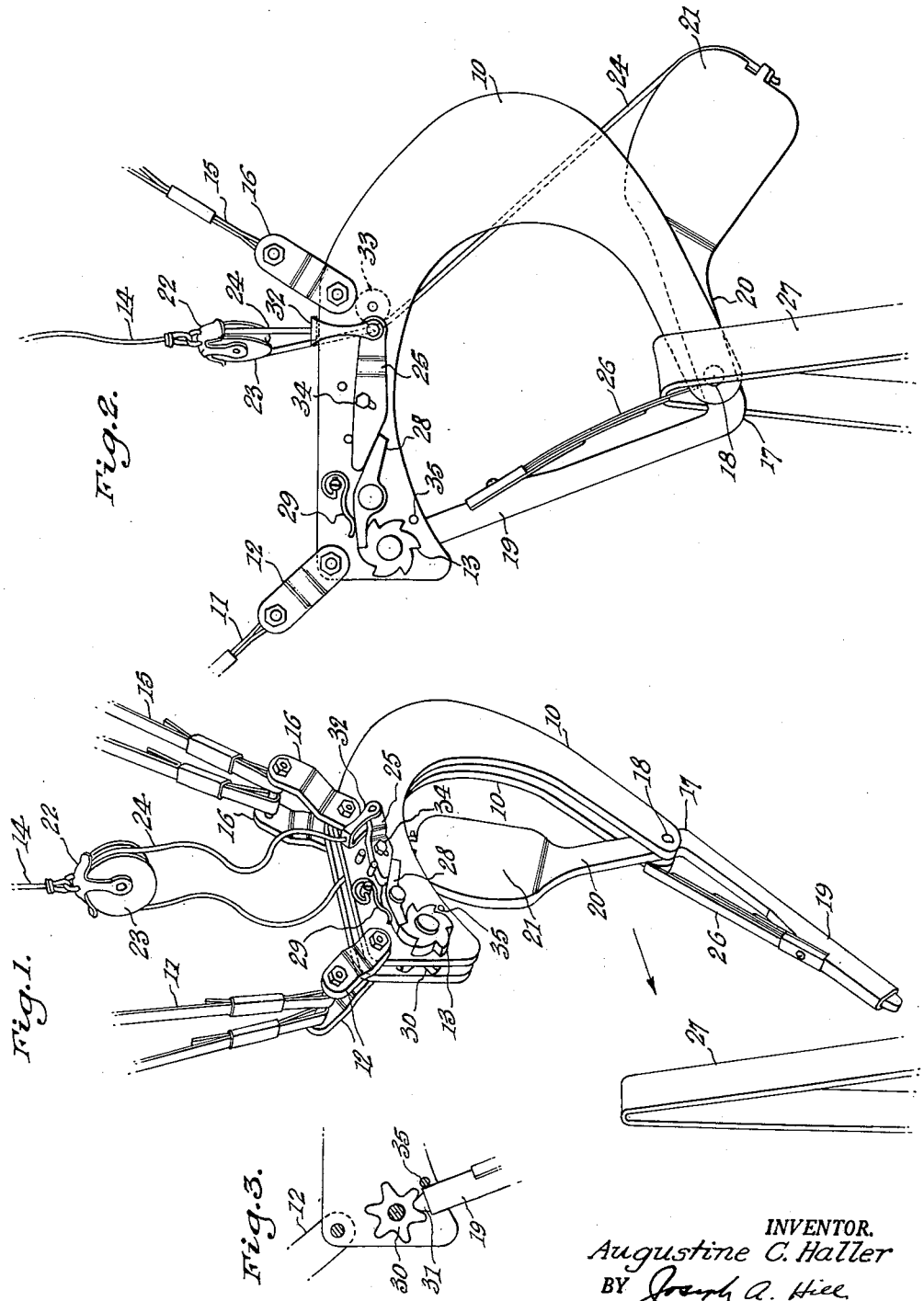
INVENTOR.
Augustine C. Haller
BY
ATTORNEYS 3,132,888
CARGO PICKUP HOOK
Augustine C. Haller, Rte. 1, Tabb, Va.
Filed June 26, 1961, Ser. No. 119,744
6 Claims. (Cl. 294—83)
(Granted under Title 35, U.S. Code (1952), sec. 266)

The invention described herein may be manufactured and used by or for the Government for governmental purposes without the payment of any royalty thereon.

This invention relates to improvements in quick engaging and releasing hooks which will enable a cargo ring to be engaged by the hook or to be released by the operator of the lifting device without the assistance of additional personnel attending the load.

Hooks of this type are particularly adapted for use with external loads carried by helicopters. The pickup and release of cargo by helicopter, without the use of ground assist personnel, is a most desirable feature for helicopter transport operations. Ground personnel are subjected not only to the danger of exposure to the propellers of and the strong air currents created by, the helicopter, but also to the danger of strong electrical forces created in the air by the helicopter and grounded by ground assist personnel when working with airborne cargo apparatus. In addition, during military operations, ground personnel are subjected to the additional hazard of exposure to small arms fire in a tactical situation.

An object of this invention is to provide a cargo hook with lateral stability, which will engage a cargo sling or ring with a minimum of pressure being applied to the hook.

Another object of this invention is to provide a hook which, in its open position, and without adding to the weight or complexity of the hook, furnishes a guide which will assist the operator of a lifting mechanism to engage his target.

A further object of this invention is to provide in a hook a release mechanism, simple, easy to operate by the operator of the lifting apparatus, which will disengage the cargo sling or hook, quickly, and without regard to whether or not the load is airborne and the weight of the load remains on the hook.

Other features and advantages will appear in the description wherein:

FIG. 1 is a perspective view of an embodiment of the hook in position to engage a cargo ring;

FIG. 2 is a side view of the hook in an engaged position; and,

FIG. 3 is an enlarged section showing the upper forward distal portion of the hook with one plate removed and the pawl 31 on the distal portion of the L-shaped lever 19 engaged with the ratchet 30, the hook being in the closed position.

Referring now in detail to the preferred embodiment of this invention, the hook, as a helicopter cargo pickup hook is shown in its entirety in both FIG. 1 and FIG. 2. The frame 10 is C shaped and comprises two plates spaced apart. Spacers are utilized between the plates of the frame to hold the parts of the frame at a uniform distance apart and rigidly with respect to one another of the plates. The hook is suspended by cables 11 and 15; cable 11 running forward and upward and secured to the upper front portion of the hook by clevis 12; cable 15 running upward and backward and secured by clevis 16 to the upper rear portion of the hook. Suspended in this fashion, the hook is given sufficient lateral stability to cause the hook to engage, by its own momentum, while moving forward, but without allowing the hook to turn preventing its proper engagement with the cargo sling. The release of the hook is accomplished by two forces being exerted simultaneously when cable 14 is pulled upward. One end of cable 24, which runs over sheave 23, the sheave being in turn attached by clevis to cable 14, is secured to operating lever extension 32. An upward force on operating lever extension 32 causes the operating lever 25 to rotate against pawl 28, which, in turn disengages pawl 28 from ratchet 13, allowing ratchet 13 and ratchet 30 to turn simultaneously. As ratchet 30 is allowed to turn, the flat spring 26, in a compressed position, causes pawl 31, at the distal portion of closing arm 19, to disengage from ratchet 30. When this occurs, the second force, applied by the pull of the opposite end of cable 24, through the spaced apart plates of frame 10, to the end of weight 21, causes closing arm 19 to turn on its axis 18 to open the hook and to force the release of the cargo ring 27.

With the hook in the open position, the weight 21 extends into the upper portion of the frame. It is held in this position against the slight opening force of a distal portion of the closing arm 19 by resting against pin 34. In the open position, the weight is balanced so as to allow, when slight pressure is applied to the weight 21 or the lever arm 20, by the cargo ring 27, to cause the lever to swing the weight 21 from its vertical position and, by the gravitational pull of the weight 21, to close the hook, engaging pawl 31 in ratchet 30, closing arm 19 coming to rest against pin 35 as shown in FIG. 3. As pawl 31 engages ratchet 30, ratchet 13, which turns simultaneously with ratchet 30, is turned in a counterclockwise direction against the slight force of pawl 28, pressure being exerted thereupon by spring 29. As closing arm 19 comes to rest against stop 35, pawl 28 falls into a notch on ratchet 13, thereby, backed by spring 29, locking ratchets 13 and 30, along with closing arm 19, in the closed position.

The carrying portion of the hook, that is, the lower inside area upon which the cargo ring will ride, is so inclined as to cause (either immediately upon closing of the hook, or upon lifting the hook with a cargo load attached to the cargo ring 27) the cargo ring 27 to slide downward and forward thereby causing sufficient pressure to be exerted on spring 26 as to bring about the release of closing arm 19 and pawl 31 from ratchet 30 when the releasing mechanism is actuated. This opening force is supplementary to that being concurrently exerted by the pull on the weight 21 by operating cable 24. Spring 26 is a desirable but unnecessary part of my invention.

In FIG. 1 the hook is in the ready position to engage the cargo ring 27. The cable 24 has been slackened after the hook was placed in its open position, thereby allowing the force of the cargo ring 27, upon engaging with lever arm 20 or weight 21, to close the hook.

FIG. 2 depicts the hook in its carrying position. The cable 24 is slack and the pawl 31 on closing arm 19 is engaged in latch 30 as shown in detail by FIG. 3. The cargo ring 27 is exerting pressure against spring 26 so as to enable pawl 31 on closing arm 19 to disengage ratchet 30 upon release of the pawl from ratchet 13 when the hook release mechanism, as described above, is actuated.

While the L-shaped lever 17, described in the embodiment, is so balanced in the open position as to remain in the open position when operating cable 24 is slack, it may be preferable under certain conditions, to have the lever, in its open position so balanced as to constantly urge toward the closed position. This can obviously be accomplished by shifting the center of gravity of the weight slightly. Such a modification requires the operating cable 24 to remain taut to hold the hook in the open position. Upon engagement with the cargo ring 27, the control cable 14 would be released immediately to allow the hook to close.

Other variations may, of course, be resorted to without departing from the scope of the invention.

I claim:
1. A cargo hook device comprising a C-shaped frame, suspension means secured to said frame, an L-shaped lever pivotally connected to a terminal portion of and coplanar with the said frame and having a weighted arm and a closing arm, means to engage and lock said closing arm to the opposite terminal portion of said frame, means for releasing said closing arm carried by said frame, an operating cable attached on one end to the end of said weighted arm of said lever and on the other end to said closing arm release means, a control cable, and a pulley including a clevis running on said operating cable with its clevis attached to said control cable.

2. A cargo hook device comprising a C-shaped frame, suspension means secured to said frame, an L-shaped lever pivotally mounted within a terminal portion of and coplanar with said frame having a weighted arm and a pawl mounting closing arm, a ratchet mounted within the opposite terminal portion of said frame so as to engage said closing arm, means for locking said ratchet upon engagement with said closing arm, means for releasing said ratchet, an operating cable attached on one end to the end of said weighted arm of said lever and on the other end to said ratchet releasing means, a control cable, and a pulley including a clevis running on said operating cable with its clevis attached to said control cable.

3. A cargo hook device as described in claim 2 in which the closing arm mounts a flat leaf spring extending proximally at an acute angle to said closing arm and terminating adjacent the weighted arm.

4. A cargo hook as recited in claim 2 wherein said C-shaped frame comprises a pair of similarly shaped mutually spaced members and said weighted arm is pivotally mounted for movement between said spaced members.

5. A cargo hook adapted to be suspended from an airborne carrier in upright position with a forwardly facing throat opening comprising a C-shaped frame, an L-shaped lever pivotally mounted at its angle on the lower end of said frame and including a throat closing arm and a counterweight arm effective to urge said throat closing arm to throat closing position, a latch rotatably mounted in the upper end of said frame including rotatable ratchets fixed on the same shaft, a pawl mounted on said frame and engageable with one of said ratchets to releasably hold said latch against rotation, a detent on the distal end of said throat closing lever arm engageable with the other of said ratchets to hold the lever arm in throat closing position, and means for selectively releasing said throat closing lever arm from said latch comprising a pawl actuating lever pivotally mounted on said frame, and cable means connected to said pawl actuating lever and effective when manually tensioned to release said pawl from the associated ratchet.

6. A cargo hook adapted to be suspended from an airborne carrier in upright position with a forwardly facing throat opening comprising a C-shaped frame having its ends at the upper and lower ends of said throat opening, an L-shaped lever pivotally mounted at its angle on the lower end of said frame and having two arms one of which is counterweighted and disposed rearwardly of the lower end of said frame and the other of which is movable between a position in which it extends forwardly from the lower end of said frame and a position in which it extends between the ends of said frame to close said throat opening, said counterweighted arm urging said other arm from its position extending forwardly from the lower end of said frame to its throat closing position, rotatable latch means mounted in the upper end of said frame and engageable with the distal end of said other arm of the L-shaped lever, pawl means engageable with said latch means to releasably hold said other arm in its throat closing position, and control means comprising a cable sheave, a first cable run over said sheave and connected at one end to said pawl means and at its other end to the counterweighted arm of said L-shaped lever, and a second cable connected to said cable sheave whereby a sufficient pull on said second cable will first release said throat closing lever arm from said latch means and then turn said L-shaped lever relative to said frame until the throat closing lever extends forwardly from the lower end of said frame and the hook is conditioned to engage a cargo loop.

References Cited in the file of this patent
UNITED STATES PATENTS

| 1,778,484 | Da Costa | Oct. 14, 1930 |
| 2,904,369 | Campbell | Sept. 15, 1959 |

FOREIGN PATENTS

| 519,699 | Italy | of 1955 |